(12) United States Patent
Marzona et al.

(10) Patent No.: US 7,232,302 B2
(45) Date of Patent: Jun. 19, 2007

(54) APPARATUS FOR CONTINUOUSLY SHAPING AN UNDULATING PROFILE INTO A PLATE OF POLYMERIC MATERIAL

(75) Inventors: Alberto Marzona, Venezia Mestre (IT); Sommariva Giacomo, Vittorio Veneto (IT)

(73) Assignee: Habasit Italiana S.p.A., Cesano Boscone(MI) (IT)

( * ) Notice: Subject to any disclaimer, the term of this patent is extended or adjusted under 35 U.S.C. 154(b) by 287 days.

(21) Appl. No.: 10/772,155

(22) Filed: Feb. 4, 2004

(65) Prior Publication Data

US 2004/0173947 A1    Sep. 9, 2004

(30) Foreign Application Priority Data

Feb. 7, 2003   (IT)   ................ TV2003A0019

(51) Int. Cl.
*B29C 53/28* (2006.01)

(52) U.S. Cl. ............... 425/170; 425/174.8 R; 425/336; 425/369

(58) Field of Classification Search ............ 425/170, 425/369, 174.8 R, 336, 370
See application file for complete search history.

(56) References Cited

U.S. PATENT DOCUMENTS

| | | | | |
|---|---|---|---|---|
| 3,165,783 A | * | 1/1965 | Martelli | 425/370 |
| 3,481,830 A | * | 12/1969 | Hanke | 425/369 |
| 3,973,894 A | * | 8/1976 | Lindner et al. | 425/370 |
| 3,993,425 A | * | 11/1976 | Dunn et al. | 425/370 |
| 6,042,359 A | * | 3/2000 | Costi et al. | 425/369 |

\* cited by examiner

*Primary Examiner*—James P. Mackey
(74) *Attorney, Agent, or Firm*—Egbert Law Offices

(57) ABSTRACT

Process and apparatus for continuously and permanently shaping a plate in plastic material according to an undulated profile. The apparatus includes a guide and positioning surface of the plate; a moulding and transferral wheel, peripherally shaped according to a plurality of seats, suitable for reproducing a continuous shaped profile; and a positioning, advancement and maintenance assembly in the form of a plate, peripheral with respect to the moulding wheel, of the mobile type, respectively; counter-clockwise in synchronization with the moulding and return wheel in a position independent of the moulding wheel. The assembly includes a pre-form presser, upstream of the surface involved in the shaping, set apart by at least one first stabilization and cooling presser, a moulding presser, interposed between the pre-form presser and a cooling presser; and a possible blade for detaching the plate from the seats.

10 Claims, 3 Drawing Sheets

APPARATUS FOR CONTINUOUSLY SHAPING AN UNDULATING PROFILE INTO A PLATE OF POLYMERIC MATERIAL

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

This invention refers to the process and an apparatus for continuously and permanently shaping a plastic plate according to an undulated profile, which, subsequently, constituting the side, should be joined along each of the two lateral ends of a conveyor belt.

The proposal, finds particular although not exclusive application in the field of apparatus for providing the working of semi-finished plastic material, such as a PVC plate or polyurethane wound on a bobbin, intended for producing components for conveyor belts.

BACKGROUND OF THE INVENTION

Conveyor belts are known. In more detail, it transpires that some of these must also provide lateral containment sides, with the obvious aim of preventing the material being transported from spilling over from the belt itself during movement. Therefore, it is understandable that the problem is more widely experienced in these belt types, structured for carrying loose products.

The need to provide sides should, however, be reconciled with the needs of the working installations provided, which, not only due to the nature of the environment where they must be placed, but also due to proper intrinsic needs, can require sinuous paths, as well as for stretches where the ring closed conveyor belt, is then forced to rotate around a terminal guide or dragging wheel, to invert the direction of advancement.

In some cases, it is simply a case of increasing the lateral ends of the belt, very often, for instance, joining a continuous profile with rounded thickness astride and along the edge, which does not create problems either in the case of indirect paths, adapting itself perfectly, or in the case of ring closed belts with to-and-fro paths of the up-down type. However, due to the quantity and type of the material to be carried, very often it is necessary to provide higher sides, in such a way as to provide a considerably deeper material containment channel with respect to conventional belts.

The increase of the channel depth, and consequently the increasing of the height of the sides creates several problems, above all recalling the drawbacks that in a first instance, with the use of low sides, seemed to have been resolved.

Prior Art

U.S. Pat. No. 3,750,864 (Nolte) is among the first significant proposals in which it was perceived that the sides could be flexible, in this case in rubber, and with a typically corrugated profile. The corrugated shape of said sides is obtained by longitudinally juxtaposing in a continuous way, and for each of the two sides of the belt, single fan-shaped open portions, so that the sides extend adapting to the bending radius imposed by the installation when the belt reverses the rotation direction in correspondence to the wheel.

The aforementioned solution has given rise to numerous variations. For example, DE4220872 (Hartmann) suggests a side with a different profile. This concerns a product in shaped plastic material with a profile that along the upper border appears substantially undulated and constant. The lower part of the product is instead obtained with a flat base portion, which allows easier anchorage along the edge of the support belt. Finally, the oblique beads that involve about three-quarters the side height development, allow the localized stiffening of said side.

State of the art most similar to the invention

The use of so-called flex or flexible sides that laterally define a certain conveyor belt type are therefore commonly used today. The problems that are therefore faced by the manufacturers of these said belt types are substantially of an economic nature, since it is evident that to produce said belts in large quantities they must determine reasonable solutions that identify a good compromise in terms of quality, production cost and times.

The same applicant company (Habasit), as is probable with other enterprises in the sector, had to design a solution to accelerate and to contain the costs of the known moulding processes. However, the first prototype immediately proved to be ineffective due to the technical-constructive characteristics and in conclusion inadequate. The invention, in more detail consists in providing a die, shaped according to a series of continuous and symmetric depressions, above which is to be placed a predetermined portion of a flat plate in plastic material, curving upstream from a coil. Once the plate has been positioned, aluminum stripping plates are placed on top, with circulating water, that act as an electrode that shapes at a high frequency the portion of positioned plate. At the end of the moulding process, the stripping plates are to be lifted, together with the plate, to thus position a new portion that is to be shaped and cycle is to be repeated.

A previous solution, in chronological order, has been described in FR1443291 (Tricot). In the latter, a working method for obtaining a container edge for conveyor belts is described. In more detail, downstream of a supply line of an elastomer band in plastic materials, an apparatus is provided for the permanent and undulated deformation of said band. The apparatus in question is made up of two coupled moulding units by which said band is transported. Each moulding unit is made up of two wheels, of which at least one is a driver, between these two wheels a chain is extended that supports a plurality of conical-shaped dies in alignment. Said two units being almost identical and paired, the first unit makes provision for the dies to rest between the others of the opposite shaping unit, in such a way as to obtain an alternating development of shapes and counter-shapes that will transfer, vulcanizing the assembly, the relative form to the band, that is dragged downstream and contextually deformed by said moulding unit.

On the base of the teaching described above the proposal mentioned in EP0802038 (Borri et al.) has been developed. Fundamentally, it also has as an object a method and an apparatus for producing a conveyor belt with undulated lateral sides. In more detail, a band made in plastic material, to form the wall of a conveyor belt is subjected to a continuous and preliminary moulding operation, which provides said plastic material band with a corrugated profile.

Also in this case, as in FR1443291 (Tricot), working is made possible by means of two coupled moulding units, each including two wheels, of which one is a driver, between each of these wheels a counter-rotating chain is extended that perpendicularly supports a plurality of parallel appendices. These appendices constitute the moulding members that when heated rest perpendicularly on the plastic material band. Portions of said continuous preformed band are subsequently welded over the surface of the belt by joining means for separate welding.

Drawbacks

Briefly, it is possible to affirm that the aforementioned Habasit proposal (stage die) is, for various reasons, substantially inadequate to fulfill the needs of current industrial level manufacturing of belts with container sides. Firstly, the suggested technical solution is not consistent with the prescribed working environment safety standard criteria, thus it would be particularly dangerous, and would therefore require at least suitable screening systems that, as a whole, would raise the respective production costs exponentially. Secondly, the Habasit solution requires the presence of an operator, as it is not automated, and finally, it presents reduced production capacity. In conclusion, considering the work to be carried out, it would constitute a non-competitive apparatus that is unjustifiable at the level of production and management costs.

The proposals EP0802038 (Borri et al.) like FR1443291 (Tricot) seem ineffective. However, it is the opinion of the applicant that they also fail to offer an effective alternative to traditional working methods. Firstly, the apparatus employed is particularly cumbersome due to its linear development that is complex and difficult to adjust. Secondly, it does not seem particularly versatile, due to the fact that working is in a certain way connected to the moulding members. The eventual substitution of the latter requires a complex and laborious intervention with excessive machine down time. Finally, a further disadvantage is linked to consumption, and this is due to the fact that a convection chamber heating system is used if the flexible band is transported. This system is particularly wasteful, as the heat tends to disperse rapidly and also heats where heating is not necessary.

Here the need to identify improved solutions is more convenient.

BRIEF SUMMARY OF THE INVENTION

This and other aims are reached with this invention, according to the characteristics as in the included claims, solving the arising problems by means of a process and an apparatus for continuously and permanently shaping a plate in plastic material according to an undulated profile, particularly including a flex side for a conveyor belt, including a supply line upstream of a plate in plastic material, curved by a corresponding coil, said plate is to supply a moulding unit, said apparatus being essentially made up of:
- a guide and positioning surface of the plate in correspondence to a moulding wheel;
- a moulding and transferral wheel, peripherally shaped according to a plurality of seats, obtained transversely with respect to the direction of advancement of the plate, suitable for reproducing a continuous undulated profile;
- a positioning, advancement and maintenance assembly in the form of a plate, peripheral with respect to the moulding wheel, of the mobile type, respectively; counter-clockwise and synchronized with the moulding and return wheel in a position independent of the moulding wheel, including: a pre-form presser, upstream of the surface involved in the shaping, set apart by at least one first stabilization and cooling presser, said pressers being axially mobile and resting perpendicularly on the interior of the corresponding seats obtained along the perimeter of the forming and transferral wheel;
- a moulding presser, interposed between said pre-form presser and a cooling presser; and
- a possible blade for detaching the plate from the seats.

Aims

In this way, by means of the considerable creative contribution, the effect of which constitutes immediate technical progress, certain objectives are achieved, all substantially extended to allow the fruition of a process and an apparatus to obtain a flex side that is highly functional with respect to existent solutions.

A first aim consists in producing a machine providing an induction moulding system, and therefore that has a good production/hour capacity for flexible sides at contained costs due to low consumption, but that is also less cumbersome with respect to those mentioned previous in terms of being compact and developed non-linearly.

A second aim is that of reducing working times, without compromising the quality of the product, or rather in some aspects improving the stability of form. In the same way, it is possible to obtain a safe apparatus, not complex and convenient for ordinary maintenance interventions.

A third aim also consists in providing an apparatus with good flexibility, capable of adapting itself easily to the working needs of the moment.

In conclusion, it is possible to produce an apparatus provided with a good technological content.

These and others advantages will appear from the following specific description of at least one preferred embodiment with the aid of the enclosed schematic drawings whose details are not to be considered restrictive but only illustrative.

DETAILED DESCRIPTION OF THE INVENTION

Figure 1:
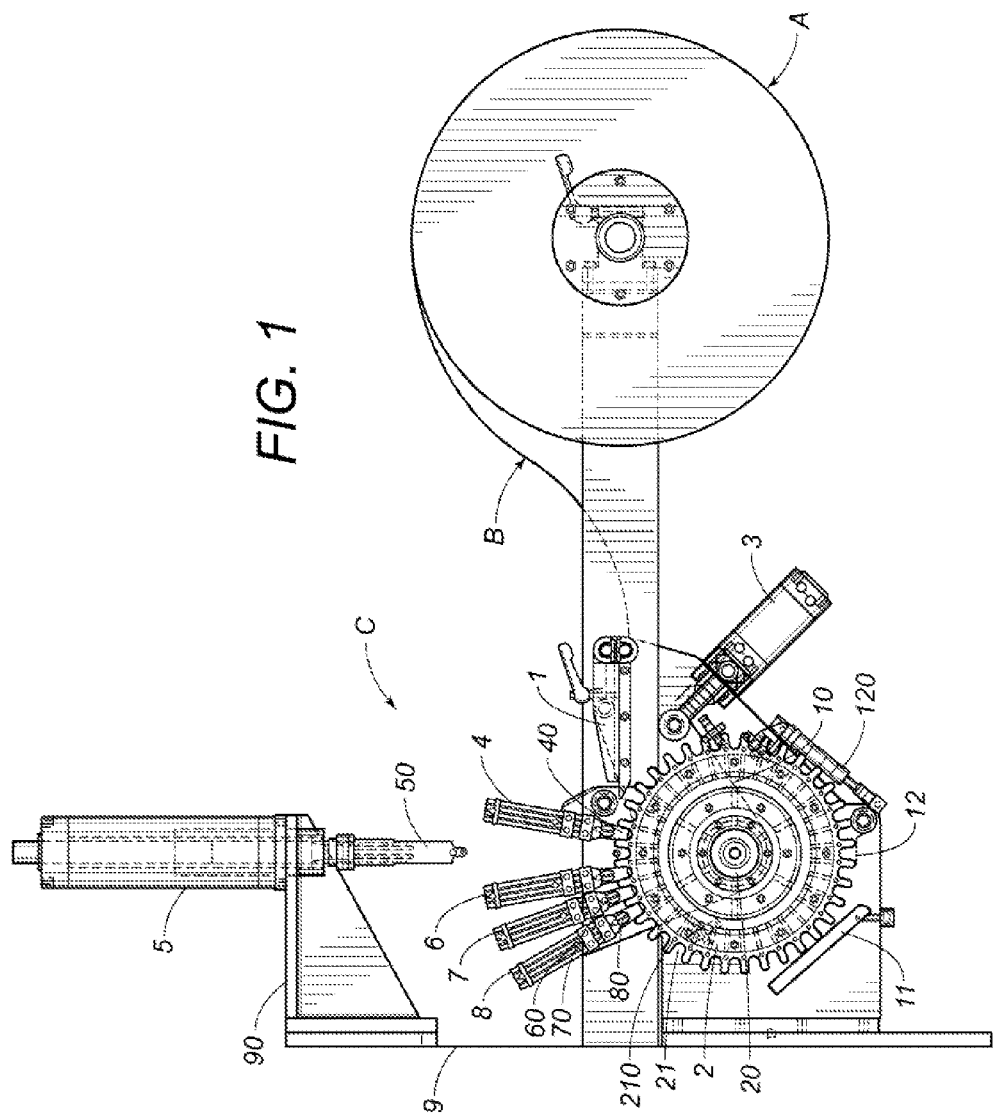
FIG. 1 is a side-view of the apparatus for continuously and permanently shaping a plate in plastic material according to an undulated profile, particularly a flex side for a conveyor belt, with the relative supplier of the plate to be shaped found upstream.

Also taking the enclosed Figures as a reference, (see FIG. 1) it is observed that an apparatus C to shape a plate B, in plastic material, such as for example of the type in polyurethane or PVC, provides, upstream of the plate, an uncoiler A of said plate B. The plate B in this case, is first induced and forced through a guide and positioning surface 1 which must provide for depositing the plate above an adjacent and vertical moulding unit, in this case made up of a moulding and transferral wheel 2. The moulding and transferral wheel 2 is hinged to a support shaft 20 and is movable, rotating counter-clockwise, by means of an adjacent actuator device 3. In this case, the moulding and transferral wheel 2 is provided peripherally with a plurality of symmetric seats 21 with a U-shaped cross-section, arranged parallel and contiguous, obtained orthogonally with respect to the longitudinal axis of advancement of the plate B. Said seats 21 are nothing other than the reproduction of the undulated profile shape that, the wheel 2, during moulding, will transfer, counter-shaping the plate B. Moreover, parallel channels 210 are provided on the sides of the base of each of the seats 21, on the interior of which thermostatic liquid circulates, by means of a conventional installation.

Figure 4:
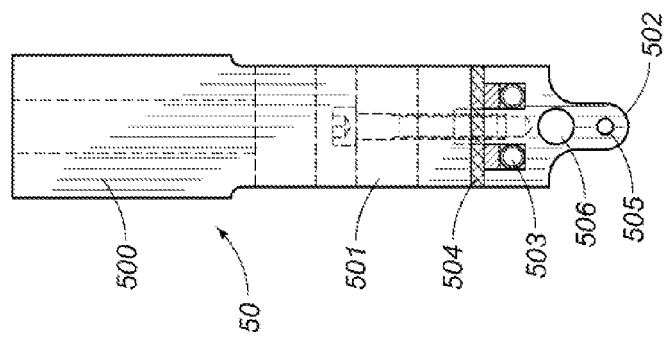
FIG. 4 represents a side view of the moulding head in FIG. 2.
Figure 2:
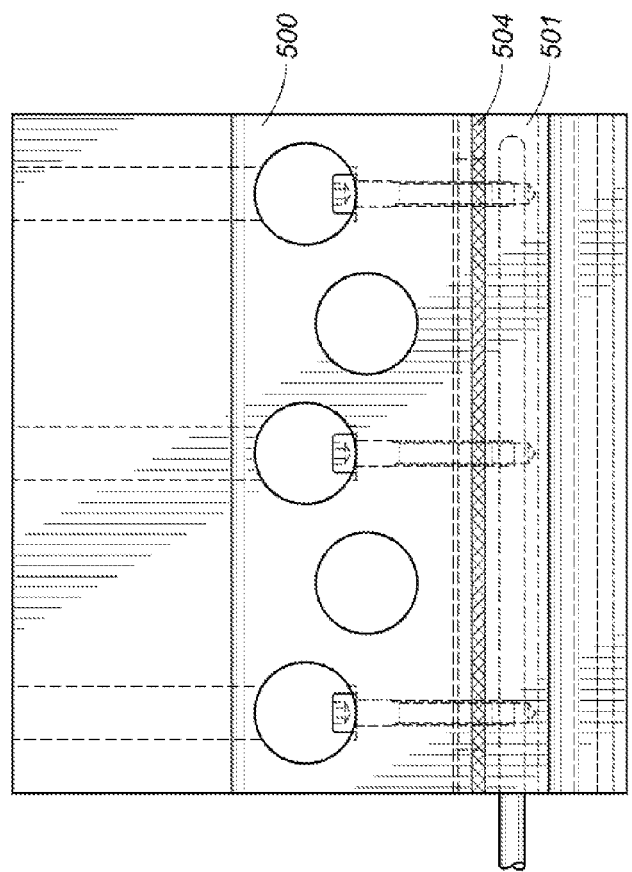
FIG. 2 represents a frontal view of the sole moulding head of the moulding presser used in the apparatus as in the previous FIG. 1.
Figure 3:
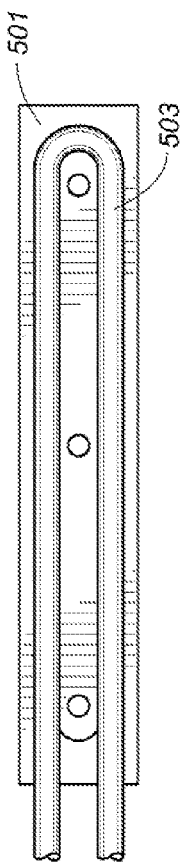
FIG. 3 represents a plan view of the disassembled lower portion of the moulding head in FIG. 2, showing the loop positioning of the heating circuit.
Figure 5:
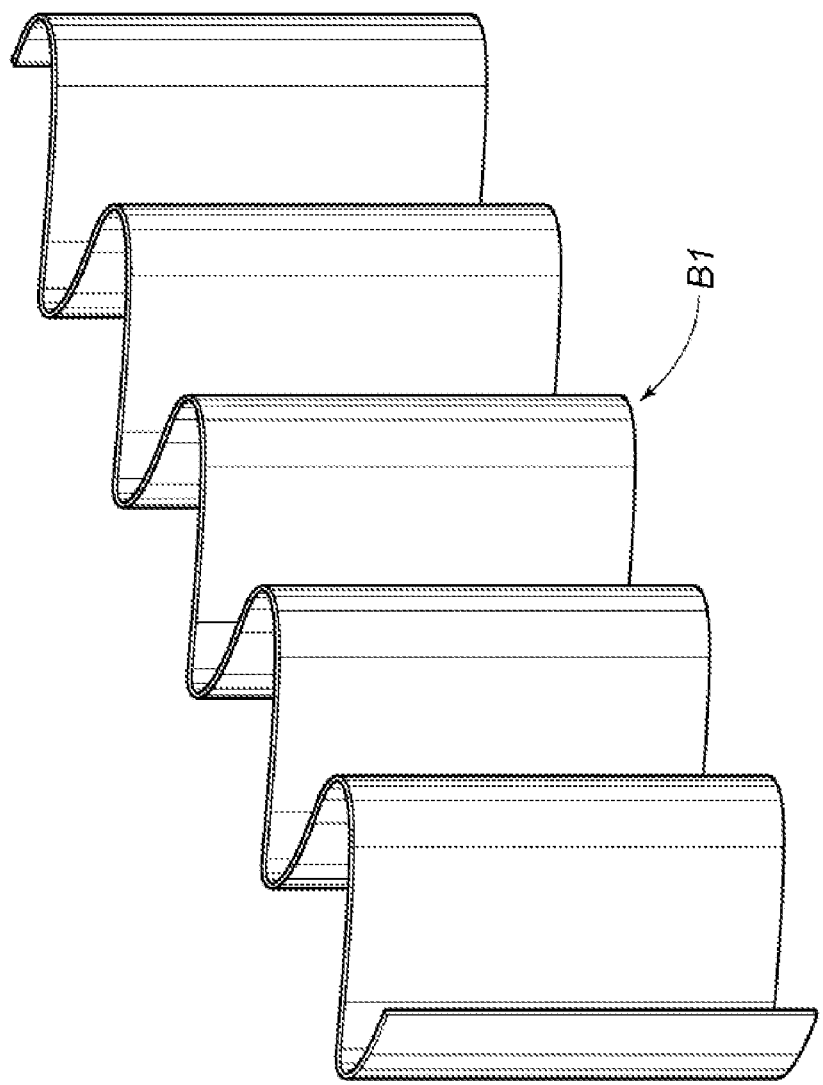
FIG. 5 is a perspective view of a portion of the flex side of the type with an undulated profile, to be joined to the corresponding surface of the conveyor belt.

In correspondence to the two upper quadrants of the moulding and transferral wheel 2, presser elements respectively 4, 5, 6, 7 and 8 are provided and rendered operative. In more detail, said presser elements 4, 5, 6, 7 and 8, are each made up of an actuator of the pneumatic type associated to the apparatus C, which axially moves a rod that has at the end a corresponding head 40, 50, 60, 70 and 80, counter-shaped like a tooth according to the profile of the seat 21. The position of the presser elements 4, 5, 6, 7 and 8, is such as to allow the longitudinal movement of the corresponding head 40, 50, 60, 70 and 80, which thus comes to rest perpendicularly with respect to the relative seats 21 of the moulding and transferral wheel 2. Presser elements 4, 6, 7 and 8 substantially carry out two functions, a first pre-form presser 4 is positioned along the moulding wheel 2 upstream of the run with respect to the presser elements 6, 7 and 8, after the guide surface 1, and has the function of cold pre-forming the plate B positioned by said adjacent guide surface 1. The second pressers 6, 7 and 8, carry out the function of stabilizing the plate B, and are positioned, one next to the other to rest in correspondence to the reciprocal seats 21 also along the wheel 2 but downstream of the moulding run or rather subsequently and separated with respect to the pre-form presser element 4. The distance between said pre-form presser 4 and the presser elements 6, 7 and 8, essentially involves the intermediate space corresponding to seat 21. In this way, between the two groups of pressers, respectively 4, and 6, 7 and 8, a moulding presser 5 is to be introduced. In more detail, the moulding presser 5, includes an actuator 51 fixed stably to a column 9 that from the posterior side of the apparatus, develops a vertical section that extends past the presser groups 4, and 6, 7 and 8 to then provide an overhanging arm 90, outstretched horizontally, in such a way as to position the moulding presser 5 over the moulding wheel 2 to logically coincide with the intermediate space remaining between said pre-form presser 4 and the presser elements 6, 7 and 8. The actuator 51, in this case a pneumatic cylinder guided by the column, moves on a vertical axis, a heating head 50 with the end profile counter-shaped with respect to the profile of the seat 21, this heating head 50 is of the type heated by induction. Other heating sources of the heating head 50 can also be used, such as for example the circulation of hot water. In more detail, (see FIGS. 2, 3 and 4) the heating head 50 mobile by means of a rod of the corresponding actuator 51, includes a support body 500 to which the electrode 501 is to be joined, on the opposite side to the rod engagement. The electrode 501 presents the lower side with a substantially toothed profile 502, counter-shaped with respect to the shape defined by the seat 21 of the moulding wheel 2. For the internal part, the electrode 501 provides a copper tube 503, substantially U-shaped and positioned horizontally astride a central island that separates the outward direction from the return direction. The copper tube 503, on the interior of which a cooling fluid is circulated, is separated from the support body 500 by means of the interposition of a layer of insulating material 504, which also has the function of completely insulating the electrode 501 from the support body 500 located above. With the purpose of maintaining the temperature of the electrode 501, a probe 505 is provided, in a position in the proximity of the end of the tooth 502, and between said probe and the copper tube 503, a channel for the circulation of the cooling fluid is provided. The interaction of the data detected by said probe 505 with the other parameters of the apparatus allows the optimal regulation of the heating head 50, according to the conditions in which is to operate.

The presser members 4, 7 and 8, in addition to carrying out a perpendicular movement with respect to the wheel 21 also carry out a satellite, peripheral and relative movement that connects them to an adjacent shoulder, 10. In this case, the shoulder 10 hinged on the axis 20 of the moulding wheel 2, is able to rotate counter-clockwise and clockwise, according to a limited run, and only in the counter-clockwise rotation in synchronization with said moulding wheel 2, by means of the contextual action imposed by the actuator device 3. Alternatively, the presser member 6 like the moulding presser 5 are exclusively enabled to carry out only the perpendicular movement with respect to the moulding wheel 2, that is engaged in a certain position and fixed with respect to the support frame of the apparatus C.

With reference to the two lower quadrants of the forming wheel 2, it is observed that, also peripherally, containing and anti-falling means 11 of the deformed plate B1 guided by the moulding wheel 2 can be provided, these containing and anti-falling means 11 brush along the undulated profile of said moulding wheel 2. Furthermore, it is observed that downstream, a blade 12 is to be provided, that interacts with a movement cylinder 120, said blade 12 has the function of detaching the plate B1 already shaped by the moulding wheel 2, forcing the plate, once detached, to build up on the lower part of said apparatus C.

Operatively, a working cycle of the plate B curved upstream of the apparatus C by an uncoiler A, includes the following steps:

(a) Blocking of the plate B upstream of the apparatus C by an uncoiler A, passing through the guiding means 1 that supply said blocking to the moulding wheel 2 of the apparatus C, said blocking being obtained by forcing to descend into the respective seats 21, over which the plate B has been deposited, the corresponding counter-shaped heads 80, 70, 60, 50 and 40, presser members 8, 7, 6, 5 and 4, in the indicated sequence, respectively 80, 70 and 60 followed by the heating head 50 of the moulding presser 5 and then by the head 40 of the pre-form presser 4;

(b) Localised execution, in correspondence to at least one relative seat 21, of the heat-moulding of the plate B, the moulding presser 5 with the heating head 50 being in the ON position;

(c) Cooling of the heating head 50 of the moulding presser 5 that is in the OFF position, the heating function being inactive;

(d) Lifting from the moulding wheel 2, of the heating head 50 of the moulding presser 5 and subsequent lifting of the stabilizing head 60 of the presser 6;

(e) Advancement of a step of the plate B, by means of the anti-clockwise rotation of the assembly made up of the moulding wheel 2 with the pressers 8, 7 and 4, whose heads 80, 70 and 40 rest in correspondence to the plate B deformed in the seats 21;

(f) Descent towards the corresponding seat 21 from the moulding wheel 2, of the stabilizer head 60 of the presser 6 resting locally on the plate B;

(g) Lifting from the moulding wheel 2 of the relative heads 80, 70 and 40 and return to position of pressers 8, 7 and 4, rotating clockwise by means of the transferral of the shoulder 10;

(h) Possible repetition of the cycle.

In an alternative solution to the cycle previously described, the previous phase (c) is substantially eliminated. More particularly, in this case the tooth 502 of the heating head 50 is also heated and maintained at a fixed temperature for the whole cycle.

For Example (a) Blocking of the plate B upstream of the apparatus C by an uncoiler A, passing through the guiding means 1 that supply the moulding wheel 2 of the apparatus C with said blocking, the latter being obtained by forcing to descend into the respective seats 21 over which has the plate B has been deposited, the corresponding counter-shaped heads 80, 70, 60, 50 and 40, presser members 8, 7, 6, 5 and 4, in the indicated sequence, respectively 80, 70 and 60 followed by the heating head 50 of the moulding presser 5 and then by the head 40 of the pre-form presser 4;

(b) Localised execution, in correspondence with the related seat 21, of the heat-moulding of the plate B, the moulding presser 5 with the heating head 50 being in the ON position;

(c) Lifting by the moulding wheel 2, of the heating head 50 of the moulding presser 5 and subsequent lifting of the stabilizing head 60 of the presser 6;

(d) Advancement of a step of the plate B, by means of anti-clockwise rotation of the assembly made up of the moulding wheel 2 with the pressers 8, 7 and 4, whose heads 80, 70 and 40, rest in correspondence with the plate B deformed in the seats 21;

(e) Descent towards the corresponding seat 21 from the moulding wheel 2, of the stabilizer head 60 of the presser 6 resting locally on the plate B;

(f) Lifting from the forming wheel 2 of the relative heads 80, 70 and 40 and return to position of pressers 8, 7 and 4, rotating clockwise by means of the transferral of the shoulder 10;

(g) Possible repetition of the cycle.

We claim:

1. An apparatus for continuously and permanently shaping an undulated profile into a plate of polymeric material comprising:
    a reel having a supply of the plate of polymeric material thereon, said supply being covered around said reel;
    a guide and positioning surface positioned so as to receive the supply from said reel thereof;
    a moulding and transferral wheel having a plurality of seats formed on a periphery thereof, said plurality of seats extending transversely relative to an advancement of the plate of polymeric material, said plurality of seats conforming to the undulating profile; and
    a pressing means positioned independent of and adjacent to said periphery of said wheel, said pressing means being axially mobile between a first position away from said plurality of seats and a second position received in at least a portion of said plurality of seats, said pressing means for forming the undulating profile in conjunction with said plurality of seats of said moulding and transferral wheel, said pressing means comprising:
    a preform presser;
    a forming presser arranged downstream of said preform presser; and
    a stabilizing presser positioned downstream of said forming presser.

2. The apparatus of claim 1, said forming presser having a heating head thereon, and heating head being heated by an induction heater.

3. The apparatus of claim 1, each of said preform presser and said forming presser and said stabilizing presser having a head with a profile conforming to a shape of each of said plurality of seats.

4. The apparatus of claim 1, further comprising:
    a blade means cooperative with said moulding and transferral wheel, said blade means for detaching the plate from said plurality of seats.

5. The apparatus of claim 3, at least one of said preform presser and said forming presser and said stabilizing presser having a cooling circuit in heat exchange relationship with said head.

6. The apparatus of claim 1, said moulding and transferral wheel having cooling means therein for cooling each of said plurality of seats.

7. The apparatus of claim 1, said forming presser comprising:
    a heating head having an electrode therein;
    a support body joined to said electrode, said electrode having a lower portion countershaped to a shape of a seat of said plurality of seats; and
    a heating fluid feedback channel on an interior of said heating head.

8. The apparatus of claim 7, further comprising:
    a probe positioned in said electrode of said heating head adjacent said lower portion of said electrode; and
    a cooling fluid channel positioned between said probe and said heating fluid feedback channel.

9. The apparatus of claim 1, further comprising:
    a column;
    a vertical section extending from said column above said moulding and transferral wheel; and
    an actuator means connected to said vertical section, said actuator means cooperative with said forming presser for moving said forming presser between said first and second positions between said preform presser and said stabilizing presser.

10. The apparatus of claim 1, further comprising:
    a movement actuator cooperative with said moulding and transferral wheel.

* * * * *